United States Patent [19]
Kropf

[11] 3,885,826
[45] May 27, 1975

[54] CAMPER VEHICLE WITH MOVABLE TOP

[75] Inventor: Omer G. Kropf, Millersburg, Ind.

[73] Assignee: Rockwood, Inc., Topeka, Ind.

[22] Filed: Dec. 22, 1972

[21] Appl. No.: 317,564

[52] U.S. Cl.................... 296/23 R; 296/27; 52/66
[51] Int. Cl............................................... B60p 3/34
[58] Field of Search .......... 296/26, 27, 23 R; 52/66, 52/67, 68; 308/3 R

[56] References Cited
UNITED STATES PATENTS

| | | | |
|---|---|---|---|
| 2,861,800 | 11/1958 | McKee | 308/3 R |
| 3,368,839 | 2/1968 | Stewart | 296/23 R |
| 3,463,538 | 8/1969 | Koon | 296/27 |
| 3,560,043 | 2/1971 | Harter | 52/66 |
| 3,674,305 | 7/1972 | Steury | 296/27 |

Primary Examiner—Philip Goodman
Assistant Examiner—John A. Carroll
Attorney, Agent, or Firm—Marmaduke Hobbs

[57] ABSTRACT

An expandable recreational vehicle has a body and a separate elevatable top which is raised by a lifting mechanism including four telescopic posts, each moved by a transversely bendable push rod. Each of a pair of push rod actuators includes a pair of parallel co-terminus hollow tubes with a run of an endless chain in each tube, and a drive for the chain. Each push rod is connected to one of the runs of the chain in one embodiment, each run of the chain supports a connector in spaced parallel relation to the chain, to which the push rod is connected, and in another embodiment two chains are used connected in end-to-end relationship by a connector including a spur to which the push rod is connected. The upper portions of each push rod extend into a telescopic post, and engage a spacer member in the uppermost post section, the spacer member being adjustably secured therein to provide for adjustment of the mechanism. A guide for the telescopic post sections includes a deformable plastic hollow member which has outstanding lugs received in apertures in a post section of large transverse diameter.

21 Claims, 12 Drawing Figures

PATENTED MAY 27 1975 3,885,826

SHEET 1

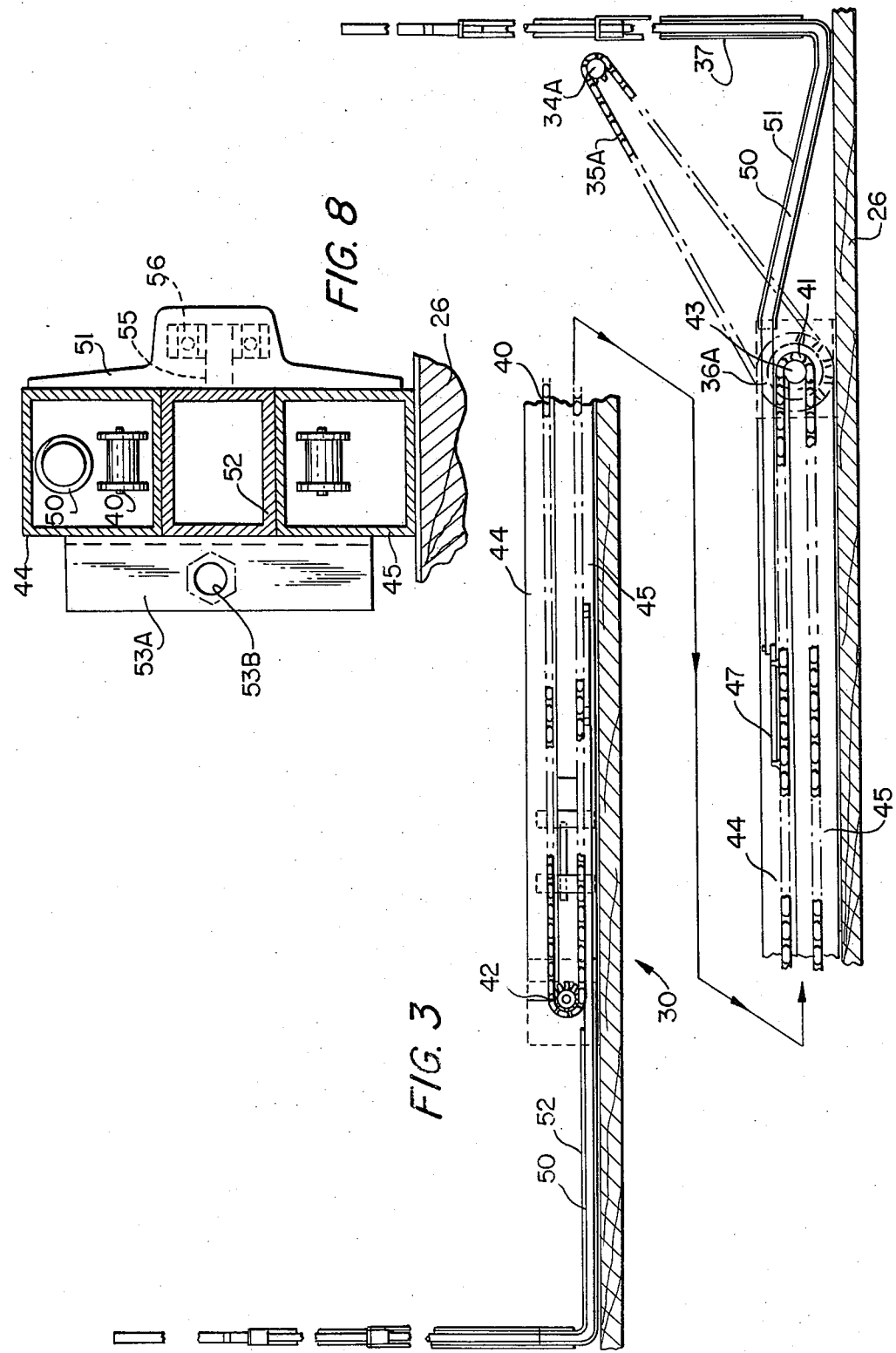

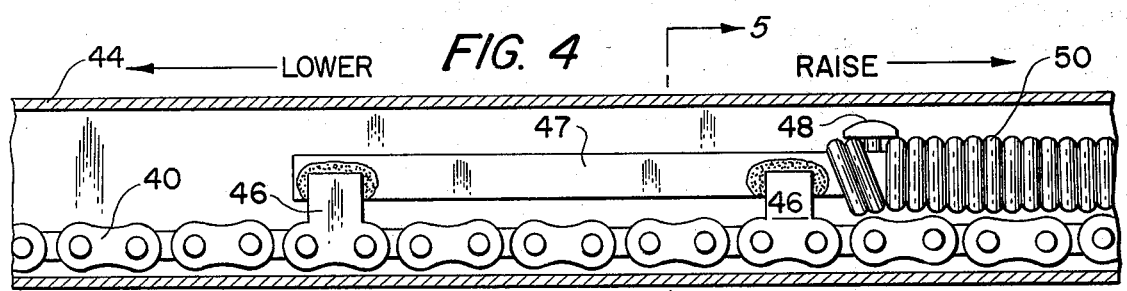
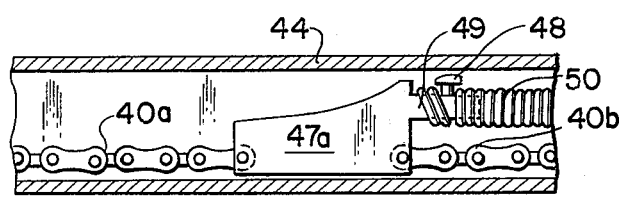
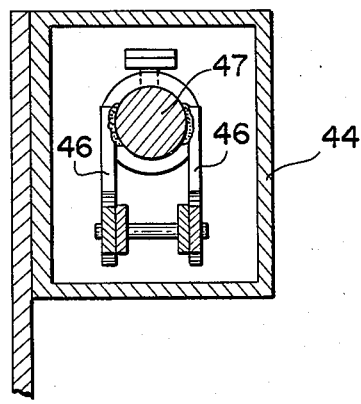
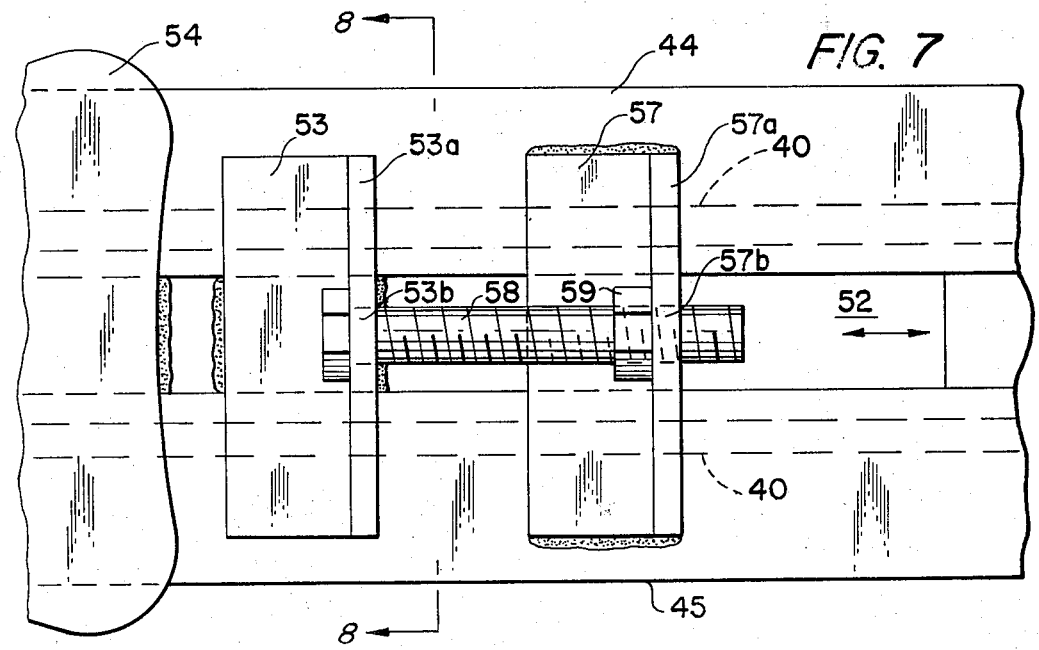

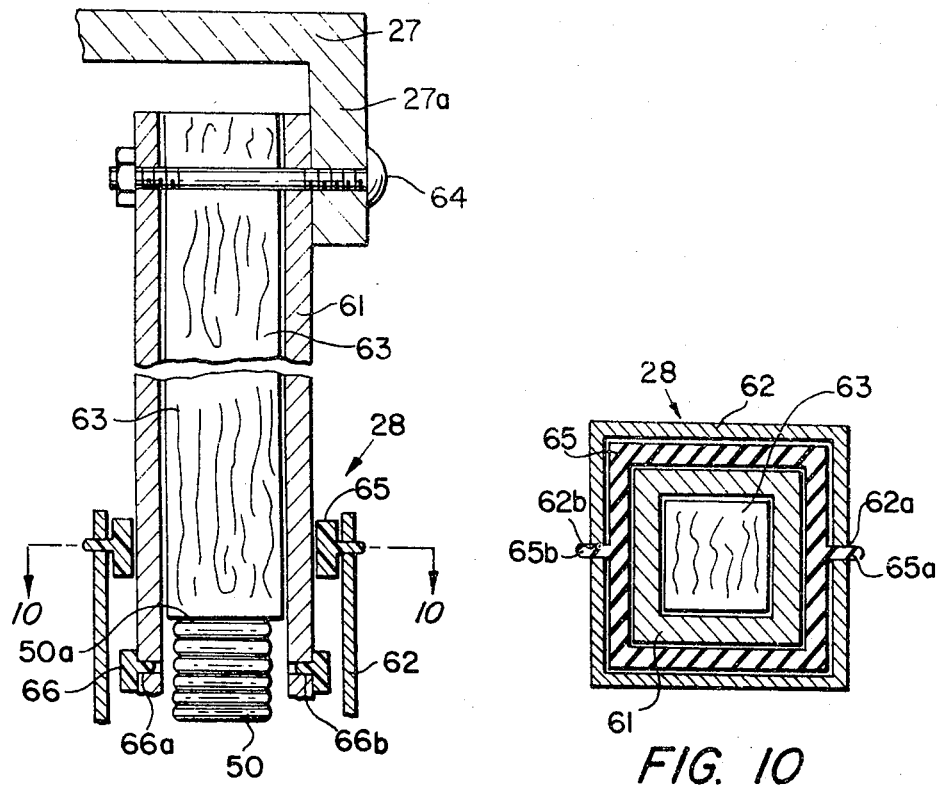
FIG. 9
FIG. 10
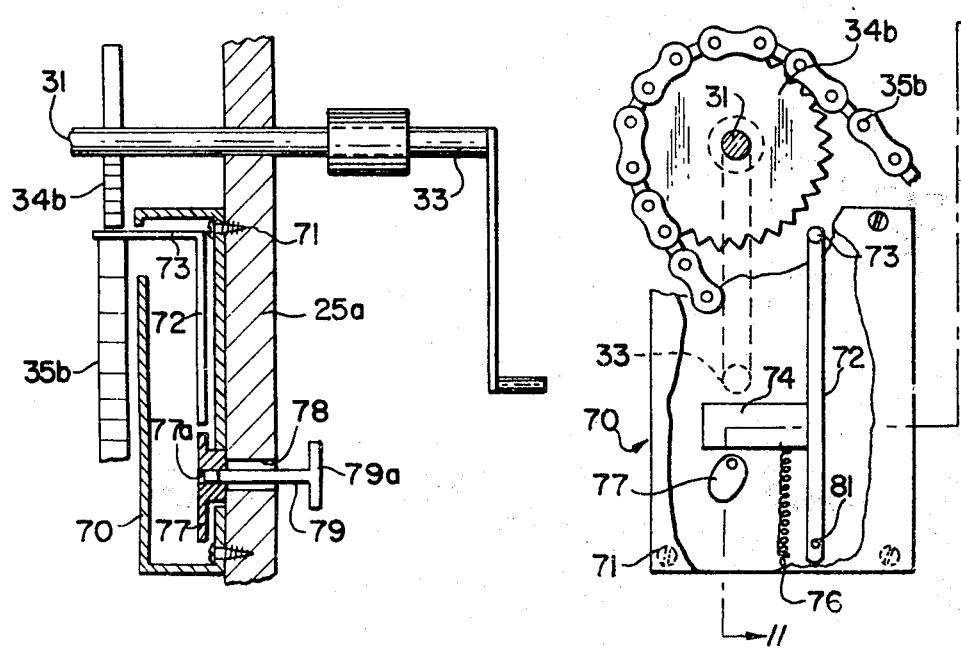
FIG. 11
FIG. 12

CAMPER VEHICLE WITH MOVABLE TOP

BACKGROUND OF THE INVENTION

The present invention relates to expandable vehicles, and more particularly to a camper vehicle having a body and a top which is elevatable relative to the body, to thereby expand the space of the body.

Recreational vehicles are now widely used, and amongst the most popular types is a trailer vehicle intended to be pulled by an automobile. Such a vehicle is transported in a collapsed state, and then is erected at the camping location, to provide additional space, such as for sleeping, cooking, etc. A camper vehicle having a body which is open at the top, and having a movable top has found great popularity. While a number of different constructions have been provided for elevating the top, it has been found that a very satisfactory construction is the provision of a telescopic post at each corner of the vehicle body, the top of the vehicle being connected to each of these posts, and various mechanisms provided for extending the telescopic posts, to thereby elevate the camper top. Typically, a flexible body is connected to the top and camper body, so as to provide portions of the camper side and end walls when the camper is in its expanded or extended condition.

Several constructions of such camper vehicles are known which utilize transversely flexible push rods, specifically in the form of coil springs, for elevating the telescopic posts, these push rods being driven in guide channels which extend both horizontally and vertically, the drive mechanism being thereby accommodated at about the level of the floor of the vehicle. While these proposals have been generally satisfactory, some deficiencies in them have been noted.

In some known constructions, the flexible push rods have their lower ends connected with cables, which are trained over appropriate pulleys, and which are drawn, as by a winch, to cause the push rods to move, thereby elevating the top through the agency of the telescopic posts in which the flexible push rods extend. In such constructions, after a period of usage, one or more of the cables become stretched, and this either requires adjustments by the user of a somewhat difficult nature, or else it is required that automatic compensating devices be included in the construction, in order to automatically make the required adjustments when the cables stretch. These devices add to the expense, and are in themselves a source of trouble, since these devices are not fool-proof, and themselves become defective. Another problem which has arisen in connection with this cable drive for the flexible push rods is the inability of the cable drive system to retract the push rods. Obviously, the cables are capable of transmitting forces in tension, but not in compression. Hence, the cable system may be slacked off, and it is then necessary to push on the roof in order to not only collapse the telescopic posts, but also to move the flexible push rods, or coil springs, in retrograde movement.

Another suggestion in the prior art for a mechanism for moving flexible push rods includes the provision of nuts on the lower ends of push rods, and a screw system for moving the nuts, this mechanism being somewhat expensive, subject to binding during extended periods of non-use, and requires an excessive amount of crank turns to raise or lower the top.

Another suggestion of the prior art was the utilization of a push rod made up of segments pivotally connected together, so that the push rod could be transversely bent in order to enable it to translate around a corner from horizontal to vertical. In this construction, each push rod segment or section was in the form of a section of a rack, including groove edges with teeth, these teeth being engaged by sprockets, each sprocket engaging one of the segmented push rods. This construction, also, is expensive, precision manufacturing being required in order to obtain the necessary strength.

The telescopic posts heretofore used have been of either cylindrical or hollow square configuration, in some cases the sections of the telescopic posts simply sliding one within the other, while in other cases the upper end of one telescopic post section was provided with a stop and slide construction of a slidable material. Such guides were often difficult to place in position in the telescopic section, thereby adding to the expense of the vehicle. Further, the connection, for driving purposes, between the flexible push rod and the uppermost section of the telescopic post was somewhat inconvenient, and did not permit of ready adjustment.

SUMMARY OF THE INVENTION

The camper vehicle herein disclosed having a body and a top vertically movable to an elevated position is provided with four telescopic posts, each at a corner, and flexible push rods, in the form of coil springs, for elevating the top, the push rods having vertical portions extending into the telescopic posts. Each pair of flexible push rods has the lower portions thereof generally horizontal, and a mechanism is provided for driving these lower ends simultaneously, equally and oppositely, this mechanism including a chain having a pair of runs, with an end of each of the pair of push rods connected to one of the runs of the chain. The push rod is connected to the chain either by a connector carried by lugs extending transversely from the chain, or, in an alternate embodiment, two smaller chains are provided, connected together in end-to-end relationship by a pair of bars, each bar having a spur connector element to which an end of the flexible push rod is connected. The chain, whether or one embodiment or the other, is within a pair of spaced parallel hollow housings, with a sprocket at either end of these housings, one of the sprockets being adjustable, so as to vary the spacing between them and thereby the tension of the chain. The adjustment comprises a slide member between the housings, the slide member being connected at one end to a support structure for the shaft of the sprocket, the housings having an anchor, and a suitable adjusting device, such as a screw and nut assembly connecting the anchor and the slide member in adjustable relationship.

Each of the posts has an upper telescopic section in which there is a linearly extending spaced member, as of wood, with a screw at the upper end extending through the camper top, the upper section and the wooden spacer member. The upper end of the flexible push rod abuts against the lower end of the wooden spacer member, and adjustment of the top can be achieved by moving the wooden spacer member in one direction or the other so as to in effect provide an adjustment for the length of the telescopic posts.

The telescopic posts are provided with guides of a low-friction plastic material such as nylon, the posts being of hollow square configuration and the guide being of similar configuration and having a pair of lugs extending transversely thereof from opposite walls, the walls of the guide being distortable, so that by flexing the guides, they may be inserted into the end of a telescopic post section, and will then spring into their normal position when the lugs pass through apertures in the section.

Among the objects of the present invention is to provide a camper vehicle with flexible push rods having a mechanism for moving the push rods, and which will drive the push rods in both top erecting and top collapsing directions. A further object of the present invention is to provide such a vehicle in which the drive mechanism is extremely economical, requiring only a minimum of adjustment, and not requiring expensive or unreliable compensating devices. Yet another object of the present invention is to provide such a mechanism which does not require pushing on the top in order to move the flexible push rods in retrograde direction. A further object of the present invention is to provide a mechanism for flexible push rods which does not require that the top be pushed on in order to move the push rods in retrograde direction. Still another object of the present invention is to provide a drive system for a camper having flexible push rods for moving the top thereof which is of economical construction, which is enclosed in order to prevent dirt from entering the mechanism, and which is substantially corrosion free, all in order to provide extended usage without trouble or complex adjustment.

Other objects of the present invention are to provide a camper with expandable top including telescopic posts having guides which are relatively easily inserted, and to provide such a camper in which initial adjustment of the mechanism, in order to insure a level top is provided, at minimal cost.

Other objects and many of the attendant advantages of the present invention will be readily understood from the following specification and drawings.

BRIEF DESCRIPTION OF THE DRAWING

FIG. 3 is an elevational view, with parts in section, taken on the line 3—3 of FIG. 2.

FIG. 4 is a longitudinal cross sectional view of a portion of the mechanism shown in FIG. 3.

FIG. 5 is a cross sectional view taken on the line 5—5 of FIG. 4.

FIG. 6 is a cross sectional view, to a reduced scale, similar to FIG. 4 and showing an alternate embodiment.

FIG. 7 is an enlarged view of the left hand portion of the mechanism shown in FIG. 3.

FIG. 8 is a cross sectional view taken on the line 8—8 of FIG. 7.

FIG. 9 is a cross sectional view through a telescopic post in accordance with the present invention, used on the vehicle of FIG. 1.

FIG. 10 is a cross sectional view taken on the line 10—10 of FIG. 9.

FIG. 11 is a cross sectional view taken on the line 11—11 of FIGS. 1 and 12, showing a locking apparatus.

FIG. 12 is a cross sectional view of FIG. 11.

DESCRIPTION OF THE PREFERRED EMBODIMENTS

Figure 1:
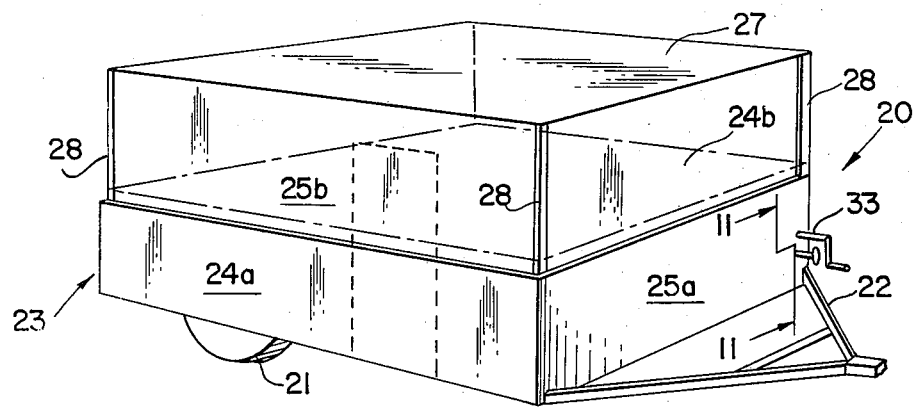
FIG. 1 is a perspective view of a camper vehicle in accordance with the present invention, with the top in raised position.

Referring now to FIG. 1, there is shown a camper vehicle generally designated 20, and including a wheel 21, and a draft tongue 22. The vehicle 20 includes a body 23 comprising side walls 24a and 24b, front wall 25a and rear wall 25b. The body 23 has, as shown in FIG. 2, a floor 26, and there is provided a top 27 movable by and supported by four telescopic posts 28.

Figure 2:
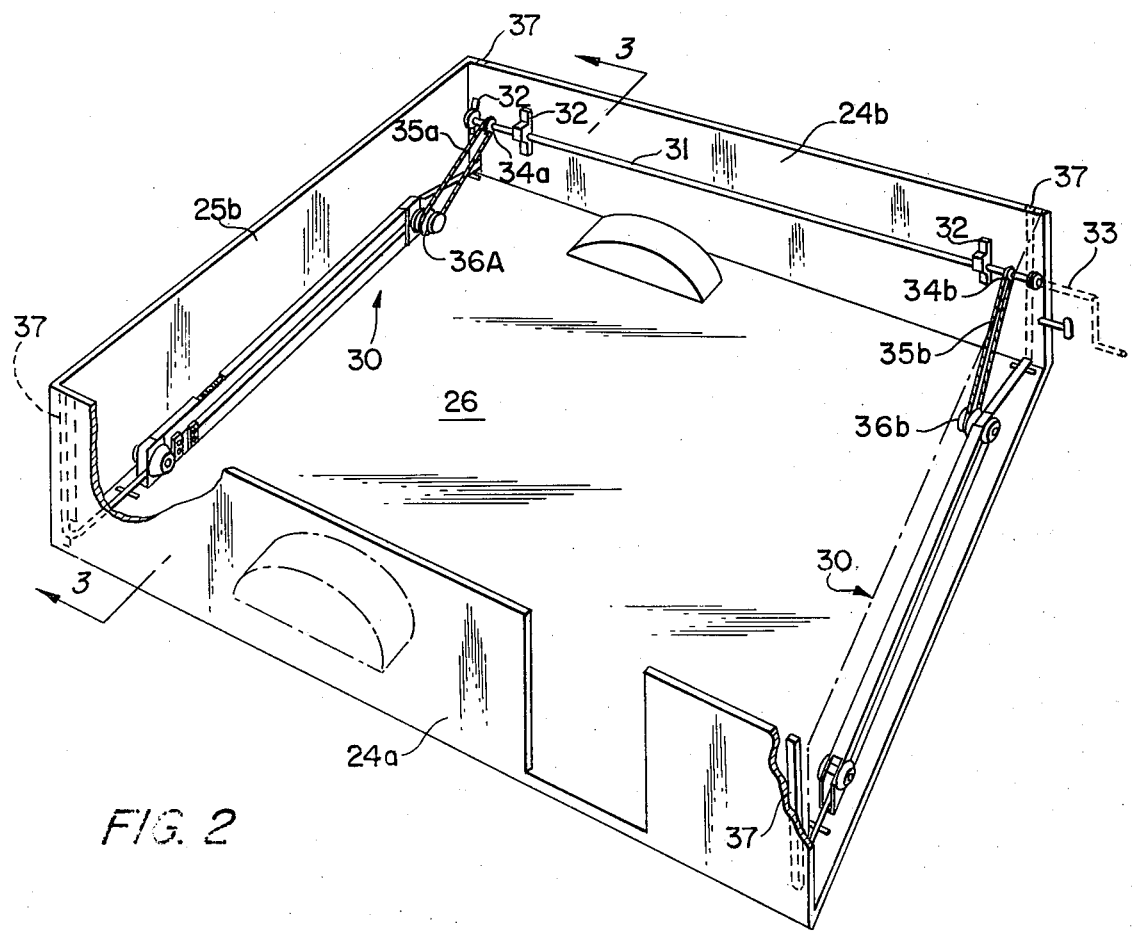
FIG. 2 is an interior perspective view, with parts removed, of the camper vehicle of FIG. 1.

Referring now to FIG. 2, there may be seen to be mounted on the floor 26 of the vehicle near the rear wall 25b a mechanism 30, a substantially identical mechanism 30 being provided on the floor 26 at the front of the body 23. A shaft 31 extends along the side wall 24b, being supported by bearings 32 suitably secured to the inside of the side wall 24b. The shaft 31 may be driven in either direction, by suitable means, such as a crank 33, although a motor-driven winch may be used for driving the shaft 31. On the shaft 31 there is a rear sprocket 34a and a front sprocket 34b. A chain 35a is trained over the rear sprocket 34a and over a drive sprocket 36a of the rear mechanism 30, and a similar chain 35b is trained over the front sprocket 34b and the drive sprocket 36b of the front mechanism 30.

At their front and rear portions, the side walls 24a and 24b have hollow guide tubes 37 therein, to be hereinafter described.

Referring now to FIG. 3, there may be seen the sprocket 34a, the chain 35a and the sprocket 36a of the mechanism 30. The mechanism 30 includes a chain 40 which is trained around a right hand sprocket 41 and a left hand sprocket 42, the sprocket 41 having a shaft 43 on which the sprocket 36a is fixed, so that when sprocket 36a is driven, it will drive the sprocket 41 and thereby the chain 40.

The mechanism 30 includes a pair of housings 44 and 45 which are in spaced, parallel and linearly extending relationship, the housing preferably being hollow tubes of square transverse cross section. An upper run of the chain 40 extends in the housing 44 and a lower run of the chain 40 extends in the lower housing 45, so that the chain 40 is substantially enclosed, thereby being protected from dirt and to a large extent from water, so as to avoid damage through either dirt or corrosion.

A transversely flexible push rod 50 may be seen extending from the right hand of the mechanism 30, and a similar push rod 50 may be seen extending from the left hand end thereof; these push rods are known per se, being in the form of coil springs with the coils in engagement throughout the length of the push rod 50, to thereby provide a construction which is transversely flexible, but substantially incompressible in the linear direction. A guide 51 is connected at its left end to the upper housing 44, and extends generally downwardly to the floor 26, guide 51 thence turning upwardly in a vertical direction, and being joined with a guide tube 37 located within the wall 24b (not shown). It will therefore be seen that the flexible push rod 50 has a vertical portion, an intermediate curved portion, and a lower, generally horizontal portion, and that the upper housing 44 will serve as a guide for the horizontal portion of the push rod 50.

Referring now to the left end of FIG. 3, there is shown a guide tube 52 extending from the lower housing 45, and being bent upwardly and connected with a vertically extending guide tube 37, which is located in the wall 24a (not shown).

In FIG. 4 there is shown a portion of the hollow upper housing 44, with the upper run of the chain 40 therein. The chain 40 is of special configuration, in that it includes specially shaped link plates 46 having transversely extending lugs, these lugs extending upwardly as shown in FIG. 4. It will be understood that there are two such link plates 46 on each side of the chain 40, as shown also in FIG. 5. Consequently, there are four upstanding lugs, to which are welded a connector 47, in the form of a cylindrical bar which is in spaced, parallel relationship to the axis of the chain 40. The lower or bottom end of the flexible push rod 50 is in encircling relationship to the connector 47, being secured in position by a suitable means, such as the set screw 48. As will be understood, movement of the chain 40 in either direction will cause corresponding movement of the flexible push rod 50, also in either direction, and the connector 47 will in effect make the portion of the chain which it overlies unable to be trained around the sprocket 43, and thereby serves as a stop for the movement of the chain 40 to the right, as shown in fIG. 4, which is the top elevating direction of movement.

Referring now to FIG. 6, there is shown an alternate embodiment, in which there is a first chain 40a, and a second chain 40b. These chains are connected in end-to-end or series relationship by a pair of spaced bars, the bar 47a being shown in FIG. 6. Bar 47a is pivotally connected to the ends of the chains 40a and 40b, and a similar bar will be connected to the other ends of the chains in the lower housing 45. The bar 47a includes a spur connector element 49 of appropriate cross section and dimension for receiving the lower or inner end of the flexible push rod 50 thereon, push rod 50 being held to the spur connector element 49 by suitable means such as a set screw 48. As will be seen in FIG. 6, the spur connector element 49 extends in spaced parallel relationship to the upper run formed by portions of the chains 40a and 40b. In this embodiment, there is avoided the necessity of providing special link plates, and therefore conventional chains may be utilized without modification, with resultant economy of construction.

It will be understood that the constructions shown in FIGS. 4–6 are of the upper runs of the chains 40 or 40a, 40b, within the housing 44, and that within the housing 45, which is the lower housing, there will be substantially identical constructions, whereby the lower ends of the pair of flexible push rods 50 may be driven simultaneously, equally and oppositely upon rotation, in either forward or reverse direction, of the sprocket 36a, and the shaft 31.

Referring now to FIGS. 7 and 8, there is shown the mechanism by which the distance between the sprockets 41 and 42 is adjusted so as to obtain proper tension on the chain 40, or chains 40a and 40b. As will be understood, the same adjustment mechanism may be used with either, and accordingly reference will be made to the embodiment including the chain 40.

There is shown in FIG. 7 the upper housing 44, the lower housing 45, the former containing the upper run of the chain 40 and the latter containing the lower run of the chain 40. The housings 44 and 45, which are of substantially equal length and are co-terminus, are spaced apart, and have a slide member 52 between them. Slide member 52, as may be seen in FIG. 8, is preferably a short section of hollow tubing of square cross section, and there is welded to the slide member 52 an angle iron 53. Also welded to the slide member 52 is a support 54 which carries a shaft 55 for the sprocket 42, the support 54 having therein rotary bearings 56, as shown in FIG. 8. As will be understood, there are two substantially identical supports 54, both of which are welded to the slide member 52, so that they both move together with the slide member 52, carrying with them the shaft 55 and the sprocket 42. Welded to the upper housing 44 and lower housing 45 is an anchor 57 in the form of an angle iron, angle iron 57 having an outstanding flange 57a having a hole 57b therein. Similarly, the angle iron 53 has an outstanding flange 53a having a hole 53b therein, in alignment with the hole 57b. A bolt 58 is welded to the flange 53a, passing through the hole 53b, and also passes through the hole 57b in the flange 57a. A nut 59 is threaded on bolt 58, bearing against the face of the flange 57a. Consequently by rotating the nut 59, the bolt 58 may be moved axially, to thereby translate the sprocket 42 and adjust the distance between sprocket 42 and sprocket 41.

Referring to FIGS. 9 and 10, there is shown the construction of the telescopic posts 28 forming a part of the camper vehicle 20. The general construction of telescopic posts is well known, and includes plural linearly extending sections slidable one within another. As is clearly shown in FIG. 10, the post 28 is of hollow rectangular cross-section, and includes, as shown in FIG. 9, plural sections, there preferably being three sections, but either two or four may be used, in practice.

The post 28 comprises an upper section 61 and a lower section 62. Section 61 is of smaller transverse dimension than is the section 62, and there may be seen extending within the section 62 the vertical section of a push rod 50, which has an upper end 50a. The end 50a is in abutting engagement with the lower end of a linearly extending wooden spacer member 63, which generally has a sliding fit within the telescopic post section 61, but is of slightly lesser length than the section 61. The spacer member 63 is secured in position in the upper section 61 by a screw or similar fastener 64 which extends through a hole in the upper end of the telescopic post section 61, and into the wooden spacer member 63. Before the screw 64 is positioned, as shown in FIG. 9, the spacer member 63 may be moved linearly within the section 61, to thereby predetermine the distance between the lower end of the spacer member 63 and the upper end of the telescopic post section 61, and this will be seen to determine the effective length of the section 61. Consequently, by utilizing the spacer members 63 in the posts 28, during the construction of the vehicle 20 normal dimensional inaccuracies can be easily and quickly accommodated by the described construction. This is necessary, for example, because it is extremely difficult, without very expensive operational techniques, to make each of the flexible push rods 50 of precisely the requisite length.

As shown in FIG. 9, the top 27 has a depending flange 27a, and the screw 64 preferably passes through the flange 27a, although as will be obvious, other constructions for securing the top 27 to the telescopic post 28 may be utilized.

At its upper end, the section 62 is provided in opposite walls thereof with apertures 62a and 62b. A guide 65 is provided having the generally hollow square cross sectional configuration shown in FIG. 10, comprising four walls each at right angles to the walls adjacent to it, and with two opposite walls having outwardly extending lugs 65a and 65b, which extend through the apertures 62a and 62b, respectively. The guide 65 is an integral molded resinous member, of a low-friction material, such as nylon. The outer dimensions of the guide 65 are substantially the same as the inner dimensions of the section 62, while the inner dimensions of the guide 65 are substantially the same as or slightly larger than the outer dimensions of the section 61, to thereby permit the latter to easily slide in the guide 65. The material and dimension of the guide 65 are such that it may be distorted and in particular the walls from which the lugs 65a and 65b extend may be distorted into concave configuration which thereby permit the ready insertion of the guide 65 into the end of the section 62, and manipulated therein until the lugs 65a and 65 b penetrate through the apertures 62a and 62b, to thereby effectively secure the guide 65 in position in the upper end of the section 62.

Preferably, in order to prevent the unintended disassembly of the telescopic posts 28, there is provided at the lower end of the section 62 a guide 66, which is generally similar in construction to the guide 65, except that it is provided with two very small lugs 66a and 66b, which extend inwardly into indentations in the lower end of the section 61, so as to secure the guide 66 to the section 61. While it is possible that the guide 66 has contact, and therefore a friction-reducing guiding effect with relation to section 62, during movement of the section 61 relative to the section 62, it will be noted that another function of the guide 66 is to provide a stop, should it contact the guide 65, to prevent the section 61 from being withdrawn from the section 62.

As will be understood, other sections of the posts 28 may have the same general construction and cooperative relationship as are disclosed in connection with the sections 61 and 62.

Referring now to FIGs. 11 and 12, there is shown an apparatus for locking the shaft 31 against rotation, in a selective manner. A housing 70 is secured to the inside of the front wall 25a of the vehicle 20, just below the shaft 31. Housing 70 may be mounted by any suitable means, screws 71 being shown for purposes of illustration. Within the housing 70 is a lever 72 having at the upper end thereof a detent 73 which extends rearwardly into juxtaposition with the sprocket 34b, on which is trained the chain 35b, as hereinabove set forth. Lever 72 also has a cam follower 74 extending from it, and is urged in a counter-clockwise manner by a suitable spring 76. A cam 77 underlies and is in engagement with the cam follower 74, cam 77 being journalled in the rear wall of the housing 70, as shown in FIG. 11. Cam 77 has a cam-key receiving opening 77a, and the front wall 25a has a concentric cam-key access opening 78. A cam key 79 extends through the opening 78, and into the cam 77, having a large head 79a thereon lying beneath the portion of shaft 31 which extends forwardly of the front wall 25a. Cam key 79 may be fixed to the cam 77, or may have a non-circular end which engages in a correspondingly shaped socket in the cam 77, so that it may be movable. Rotation of the cam key 79 will effect rotation of the cam 77, thereby causing the lever 72 to rotate in a clockwise manner (as shown in FIG. 12) about the pivot pin 81 which extends through the lower end of lever 72 and the rear wall of housing 70. This rotation of the lever 72 will withdraw the detent 73 from engagement with the sprocket 34b, thereby permitting rotation of the shaft 31 by the crank 33, and consequent movement of the camper top in the manner hereinabove set forth. As will be understood, the cam-key 79 may also be rotated so as to permit the detent 73 to return to the position shown in FIGS. 11 and 12, wherein it will lock the sprocket 34b against rotation, and will thereby prevent operation of the crank 33 and movement of the camper top.

In operation, when the top 27 is to be raised, the crank 33 is inserted into an appropriate socket, and joined with the end of the shaft 31, and then rotated, to rotate the shaft 31, and through the chains 35a and 35b and the sprockets 36a and 36b of the two mechanisms 30. This will cause movement of the chains 40, or 40a and 40b, the two chains moving simultaneously and the same amount. Further, the upper and lower runs of each of the chains will move simultaneously, equally and oppositely, thereby driving the flexible push rods 50 in a path determined by the housings 44 and 45, the guides 51 and 52, and the guide tube 37. This will cause the upper portions of the transversely flexible push rods 50, which are vertical and which extend in the posts 28, to extend or raise the posts 28, to thereby elevate the top 27 of the camper. The movement will continue until the flexible walls of the camper vehicle, which may typically be made of canvas and which are connected to the top 27 and to the body 23, are drawn taut, and thereby serve to stop the movement of the top 27. During this movement, the upper ends 50a of the flexible push rods 50 will be in engagement with the lower ends of the wooden spacer members 63, and the various sections of the telescopic posts will move smoothly and with minimum resistance relative to each other, being guided by the guides 65, and to some extent by the guides 66.

When the top 27 is to be lowered, the crank 33 is rotated in the opposite direction, to thereby drive the chains 40 and 40a, 40b in the opposite directions, and there will thereby be effected a positive retrograde movement of the flexible push rods 50. Normally, the weight of the top 27 will be sufficient to cause the posts 20 to telescope downwardly, as the support provided by the flexible push rods 50 is withdrawn, but if necessary a slight downward push on the top 27 will suffice to lower it.

The construction including the mechanism 30 and the shaft 31 and sprockets 34a, 34b, 36a, 36b, and chains 35a and 35b is economical, provides for the above noted positive retraction of the push rods, and is not subject to maladjustment, as occurs when cable operating devices are utilized and the cables become stretched, or require expensive compensating devices. The constructions including the chains 40 or 40a, 40b are relatively economical, giving long service, and with a minimum adjustment, due to wear or the like, being accomplished by the adjustment construction including the bolt 58.

The construction of the mechanism 30, including the hollow housings, provides support for the sprockets at either end for the chains 40 or 40a, 40b, while at the same time providing a construction which encloses the chains, thereby diminishing the possibility that dirt and water will have access to the chains, and causing them to have shorter lives or to malfunction. In connection with the construction utilizing the two chains 40a and 40b, standard chains, without variations, may be utilized, and a simple and economical connector provided. Further, the construction including the wooden spacer member permits adjustment of the apparatus during assembly, while the guides 65 and 66 provide for low-friction operation, and ease and economy of assembly.

It will be obvious to those skilled in the art that various changes may be made without departing from the spirit of the invention and therefore the invention is not limited to what is shown in the drawings and described in the specification but only as indicated in the appended claims.

I claim:

1. A vehicle having a body and a top vertically movable between positions elevated above and adjacent to said body,
   a pair of transversely flexible push rods each having a generally horizontal portion, an intermediate curved portion and a generally vertical portion,
   means for connecting said vertical portions to said top,
   means for guiding each push rod during movement thereof in a predetermined path,
   each said push rod having a lower end and said horizontal portions extending in opposite directions therefrom,
   and reversible means for moving said lower ends simultaneously, equally and oppositely comprising endless flexible chain means having a first run and a second run, means connecting the lower end of each said push rod to a said run,
   and means for driving said chain means selectively in either direction.

2. The vehicle of claim 1, said means for driving said chain means comprising sprocket means, and means including a shaft for driving said sprocket means.

3. The vehicle of claim 1, said chain means comprising a single chain, lug means extending transversely from said chain, a connector supported by said lug means in spaced, parallel relation to said chain means, and means for securing said push rod lower end to said connector.

4. The vehicle of claim 3, said lug means comprising a first pair of lugs and a second pair of lugs spaced from said first pair of lugs, said connector comprising a rigid bar overlying plural links of said chain.

5. The vehicle of claim 1, said chain means comprising a first chain and a second chain in series comprising a pair of spaced bars each pivotally connected to an adjacent end of said first and second chains, and a spur connector element carried by each said bar, each of said push rod lower ends being connected to a said spur connector element.

6. The vehicle of claim 5, each said spur connector element being integral with a said bar.

7. The vehicle of claim 1, a pair of spaced sprockets supporting said chain means, and a pair of spaced, parallel, linearly extending hollow housings extending between said sprockets, each said housing having a run of said chain means therein.

8. The vehicle of claim 7, and means for adjusting the spacing between said sprockets.

9. The vehicle of claim 8, wherein one said sprocket has a supporting shaft, said adjusting means comprising means for supporting said sprocket shaft, anchor means secured to at least one of said housings, and means for moving said sprocket shaft support means relative to said anchor means.

10. The vehicle of claim 9, said adjusting means comprising a slide member between said housings connected to said sprocket shaft supporting means.

11. The vehicle of claim 1, said vehicle including a pair of telescopic posts each comprising a first lower section and a second upper section fixed to said top, a push rod vertical section extending in said telescopic post, and means connecting the upper end of said push rod to said second section.

12. The vehicle of claim 11, said last mentioned means comprising a linearly extending spacer member in said second section, means securing said spacer member in said second section, said push rod having an upper end abutting the lower end of said spacer member.

13. The vehicle of claim 12, wherein said securing means comprises a fastener extending transversely of said telescopic post second section and said spacer member.

14. The vehicle of claim 13, wherein said fastener extends through said top.

15. The vehicle of claim 11, wherein each said telescopic post lower section is of relatively large transverse dimension and telescopically receives a second section of relatively smaller transverse dimension, and guide means in said lower section upper end comprising a hollow member having lug means extending transversely thereof, said upper end having aperture means receiving said lug means, said hollow member having an inner dimension and shape for slidably receiving said second section therein, said guide means being of low-friction, distortable material.

16. The vehicle of claim 1, and further comprising locking means for said chain driving means.

17. The vehicle of claim 1, said chain driving means comprising a shaft having a sprocket thereon, and releasable locking means engaging said sprocket.

18. The vehicle of claim 17, said locking means comprising a movable detent engageable with said sprocket, and means for moving said detent to a release position.

19. A vehicle having a body and a top vertically movable between positions elevated above and adjacent to said body,
   telescopic posts having plural sections comprising a lower first section of relatively large transverse dimension and telescopically receiving a second section of relatively smaller transverse dimension connected to said top,
   means for moving said second section relative to said first section to thereby elevate said top,
   said moving means comprising a transversely flexible push rod having an end portion extending into said post,
   a linearly extending spacer member in said second section,
   means securing said spacer member in said second section, said push rod having an upper end abutting the lower end of said spacer member.

20. The structure of claim 19, said securing means comprising a fastener extending transversely of said second section and said spacer member.

21. The structure of claim 20, said fastener extending through said top.

* * * * *